Oct. 4, 1938. J. E. LEONARD Re. 20,875

COMBINATION RANGE

Original Filed March 5, 1932

INVENTOR.
Joseph E. Leonard
BY
Joseph B. Gardner
ATTORNEY.

Reissued Oct. 4, 1938

Re. 20,875

UNITED STATES PATENT OFFICE 20,875

COMBINATION RANGE

Joseph E. Leonard, Berkeley, Calif., assignor to Hammer-Bray Company, Oakland, Calif., a corporation of California Original No. 1,989,372, dated January 29, 1935, Serial No. 596,950, March 5, 1932. Application for reissue June 11, 1936, Serial No. 84,777

14 Claims. (Cl. 126—4)

The invention relates to a combination range and relates more particularly in the present embodiment to a range of this type made up of gas cooking stove and gas heater units.

An object of the invention is to provide a range of the character described in which the heater unit, while of the gas-operated air-circulating type, is built into the range in the same manner but in place of the modern coal and wood kitchen heater, and thus forms both structurally and in appearance a continuation or extension of the body parts of the cooking unit of the range.

Another object of the invention is to provide a range of the character described in which heated air from the heater unit will be allowed to discharge through a continuation of the cooking top of the cooking unit so that additional cooking area is afforded.

A further object of the invention is to provide a range of the character described in which the heating of the air for circulation through the heater is effected in part by the heat generated by the cooking unit as well as by the heater unit.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing.

Figure 1:
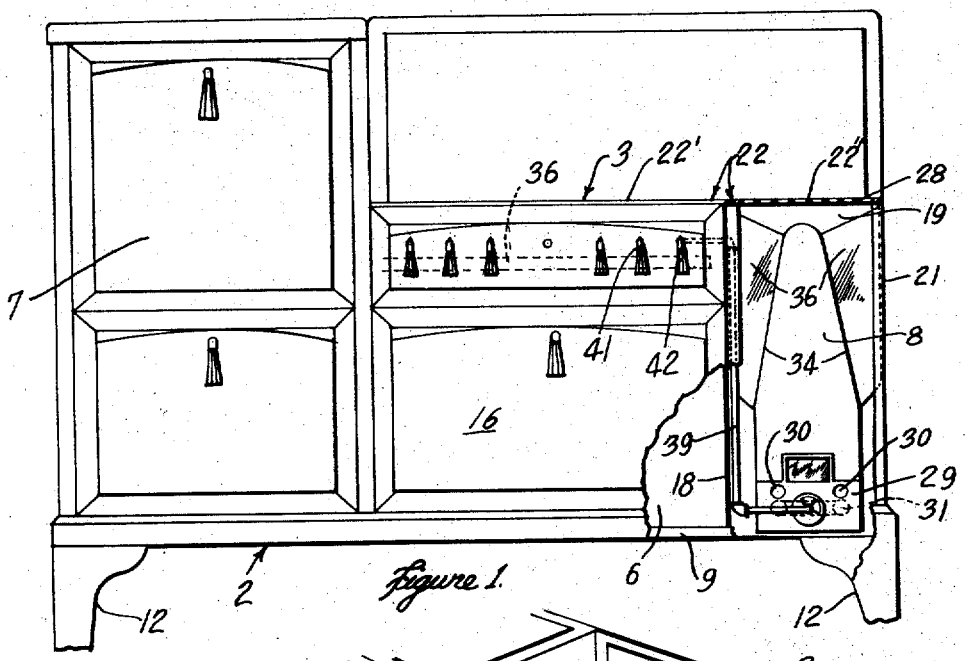
Figure 1 is a front view of a range constructed in accordance with my invention, parts being broken away and shown in section.

As illustrated in the drawing, my invention is embodied in a range 2 having a cooking unit 3 here shown provided with a top-gas burner chamber 4 superposed over a warming compartment 6. At one end of the unit 3 may be disposed stove elements 7 such as an oven and broiler, while at the other end is arranged a heater 8, the unit 3, the elements 7, and the heater 8 being preferably mounted on a common frame 9 supported in spaced relation to a floor by legs 12. While the unit 3 is here shown as of a type using gaseous fuel for operation, it will be understood such unit may be of a type operating with electricity, coal, wood, or other fuels.

The heater 8 as before explained is of the gas operated air circulating type and has its front and rear walls 13 and 14 coplanar with and of the same height as the corresponding walls 16 and 17 of the central unit 3. The heater and cooking unit are held in contiguous relation and have a common wall 18 between them which separates the burner chamber and warming compartment of the unit 3 from an open chamber 19 defined in the heater between the walls 13 and 14 and the walls 18 and 21, the wall 21 forming the outer end of the heater as well as one of the outer ends of the range. In the present design the front wall 13 of the heater is preferably in the form of a door so that ready access may be had to the chamber 19 from the front of the stove.

Figure 3:
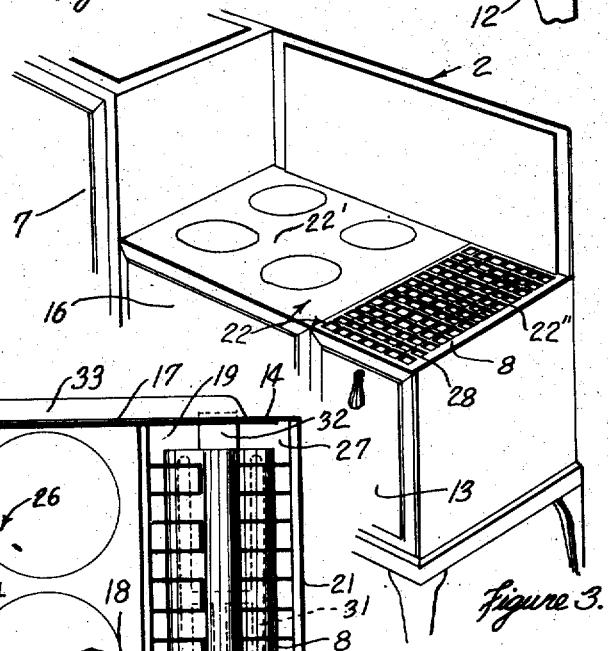
Figure 3 is a fragmentary perspective view of the range.
Figure 2:
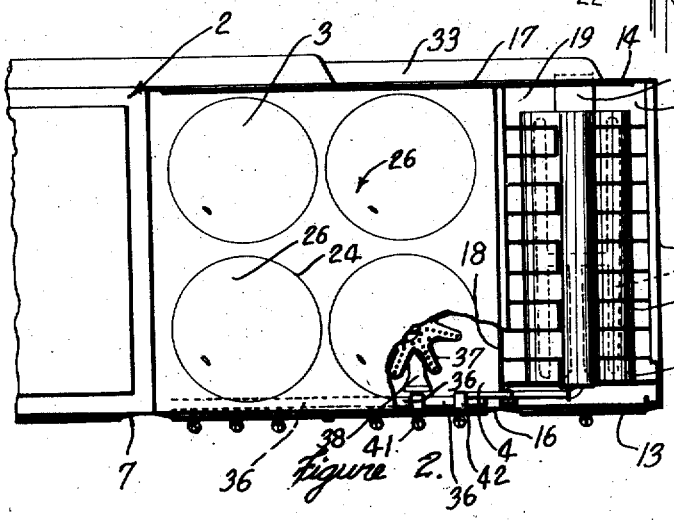
Figure 2 is a fragmentary plan view of the range, partly in section and with the heater cover plate removed.

As will be clear from Figures 1 and 3, the cooking unit 3 and the heater unit 8 have a common top 22; in other words the member which provides the cooking top for the unit 3 is continued to form a top for the heater. The portion 22′ of the top, which lies over the unit 3, is coplanar and may be formed integral with the portion 22″ which overlies the heater, but preferably these portions are formed separate in order to facilitate construction and ease of handling, said portions being also independently removable. The cooking top portion 22′ is, as here shown, of the closed type and is formed with openings 24 engaged by lids 26, while the top portion 22″ is formed with an opening 27 which is practically co-extensive with the chamber 19. A grating 28 extends across the opening and the upper surface thereof is preferably flush with the rest of the top.

Mounted within the chamber 19 and spaced from the walls 18 and 21 thereof is a closed combustion chamber 29 which preferably extends for practically the length and depth of chamber 19. A gas burner 31 is contained within the chamber 29 adjacent the bottom, and the latter thereat is open in order to afford the necessary supply of secondary air to the burner. An opening 30 in the front wall of the combustion chamber affords access to the burner from the front of the range when the door 13 is open. The chamber 29 is preferably vented by means of a vent pipe 32 which leads from near the top of the chamber to the vent pipe 33 of the top gas burner chamber 4, each of said pipes being brought from the rear wall portions of the associated chambers.

The chamber 29 may be formed in any suitable manner, but as here shown the side walls 34 thereof converge upwardly and are provided with heating fins 36 so as to more effectively heat the air as the latter is drawn from through the open bottom of chamber 19 and discharged through the openings in the top 22'' after having passed between walls 34 and the opposing walls 18 and 21 of chamber 19.

At the front of burner chamber 4 and concealed behind the front wall thereof is preferably positioned a suitable gas manifold 36 which supplies gas to the top-gas burners 37 in said chamber by suitable pipe connections 38 in the well known manner, and as clearly shown in Figure 1, by means of a pipe 39 gas is supplied from the manifold to the burner 31 of the combustion chamber 29. Control of the flow of gas to the burners 37 and 31 is afforded by means of cocks 41 and 42 respectively, all of which are preferably disposed in horizontal alignment at the front of the stove unit 3.

It will be evident of course that the burners 37 and 31 may be lighted independently of each other so that the heater unit may be operated independently or simultaneously with the cooking unit 4. It will also be noted that when the heater is lighted, not only may it function to heat and circulate the air in the room, but it may be used for cooking, simmering, or food warming purposes since practically all air heated thereby ascends through the top 22, and any vessel placed thereon over the openings will not only receive the heat from the discharging air but from the fins and walls of the chamber 29 directly. Thus the portion of the top over the heater materially increases the cooking area of the range, and since the top portions of the two units are continuous and coplanar the vessels thereon may be readily moved from one portion to the other with little or no effort and without danger of disturbing the contents.

Appreciably increased circulation and heating of the air in the heater unit will be had when, in addition to the heater burner, any of the burners in chamber 4 is lighted. This will be evident from the fact that a large portion of the air ascending in chamber 19 passes in intimate contact with the wall 18 and thus any heat generated in the unit 4 and imparted to such wall will be absorbed by the ascending air afforded.

It will now be clear that the range of my invention is well adapted to the accomplishment of the objects hereinbefore referred to.

I claim:

1. A cooking stove comprising a rectangular cooking top having a portion thereof substantially closed and an adjoining portion of open grille, a burner disposed beneath and arranged to heat said closed portion and air heating and circulating means disposed beneath and providing for an upward flow of pure unadulterated air through said grille portion, said grille portion completely overlying said means and extending from said closed portion over substantially the entire remainder of the length and breadth of said top.

2. In a cooking stove, a cooking top comprising in combination contiguously formed and coplanarly extending closed and grille portions, a burner compartment disposed beneath and arranged to heat said closed portion, a warming closet disposed below said compartment, a common end wall for said compartment and closet, a burner casing disposed opposed to and spaced from said end wall over substantially the latter's entire depth and defining therewith an air passage registering with said grille top portion, said casing being divergently extended from said end wall and terminating below said cooking top so as to increase the sectional area of said passage towards the top thereof.

3. In a stove, a cooking top comprising a closed portion and a contiguous coplanar open grille portion, a burner compartment below and arranged to heat said closed portion, a vertically disposed burner casing spaced from an end wall of said compartment and forming therewith an air passage registering with said grille top portion, a burner provided at the lower end of said casing a door positioned when in closed position in coplanar relation to the forward wall of said compartment and opposed to and spaced from the front wall of said casing in a manner defining therewith an air passage, said door being mounted for movement from a closed position to an open position providing access to said casing and burner.

4. In a stove, a cooking top comprising a closed portion and a contiguous coplanar open grille portion, a burner compartment below and arranged to heat said closed portion, a vertically disposed burner casing spaced from an end wall of said compartment and forming therewith an air passage registering with said grille top portion, a burner provided in said casing, a door positioned opposed to and spaced from the front wall of said casing in a manner defining therewith an air passage, said door being mounted for movement to a position providing access to said casing and burner.

5. In a combination range of the character described, a cooking top including a cooking section with cooking openings, and an open section coplanar to the cooking section and having an opening for cooking or heating of an area having a length and breadth at least equal to the length and breadth respectively of each of the openings in the cooking section, a top gas burner chamber under and coextensive with the cooking section, burners in said chamber under each of the openings, an air circulating chamber under and coextensive with said open section and with the entire area of the opening thereof, a casing within said air chamber spaced from the top and sides thereof, a burner in said casing, and a grille covering the entire opening in the open section and overlying said casing.

6. In a combination range of the character described, a cooking top including a solid section with cooking openings and an open section coplanar to the solid section and having an opening for cooking or heating of an area having a breadth and length at least equal to the breadth and length of each of the openings in the solid section, a top gas burner chamber under said solid section, an air circulating chamber under and coextensive with the open section, a grille covering the opening in said open section and defining the top of said air chamber, a door defining both the front of said air chamber and the range thereat, and an inner casing within said air chamber having its top and front walls spaced from said grille and door respectively.

7. In a combination range of the character described, a cooking top including a solid section with cooking openings and an open section coplanar to the solid section and having an opening for cooking or heating of an area of a length and breadth each at least equal to the length and breadth respectively of each of the openings in the solid section, a top-gas-burner chamber under and entirely coextensive with said solid top, an air circulating chamber under and entirely coextensive with said open section, a grille covering the opening in said open section and defining the top of said air chamber, a casing within said air chamber, a burner in said casing provided at the front of the casing and within said air chamber, an air mixing control valve, the front wall of said casing having an opening affording access thereto, and a door defining the front of said air chamber and the range portion thereat.

8. In a combination range and hot air circulating heater, a cooking compartment and an air heating chamber separated by a common wall but in heat transfer relation by conduction, said air heating chamber being open at the bottom and top for the circulation of the heated air, an open grille completely covering said air heating chamber at the top thereof, a heater in said chamber spaced from the top and walls thereof and forming therewith passages for the circulation of heated air past the walls of the heater to said open grille, and means connecting said heater to a flue.

9. In a combination range and hot air circulation heater, a cooking compartment comprising a top burner chamber and oven and an air heating chamber separated by a common wall, but in heat transfer relation by conduction, said top burner compartment having an overlying cooking top with cooking openings, said air heating chamber being open at the bottom and top for the circulation of the heated air, an open grill used as an air register or warming top completely covering said air heating chamber at the top thereof, said cooking top and grill being coplanar, a closed heater in said air heating chamber spaced from the top and walls thereof and forming therewith passages for the circulation of heated air past the walls of the heater to said open grill outlet, and means connecting said heater to a flue.

10. In a combination range and hot air circulation heater, a cooking compartment and an air heating chamber separated by a common wall but in heat transfer relation by conduction, said air heating chamber being open at the bottom and top for the circulation of the heated air, an open grill completely covering said air heating chamber at the top thereof, a closed heater in said air heating chamber spaced from the top and walls thereof and forming therewith passages for the circulation of heated air past the walls of the heater to said open grill, means connecting said heater to a flue, said flue connected heater open at the bottom for the admission of secondary air for combustion.

11. In a combination range and hot air circulation heater, a cooking compartment and an air heating chamber separated by a common wall but in heat transfer relation by conduction, said air heating chamber being open at the bottom and top for the circulation of the heated air, an open grill completely covering said air heating chamber at the top thereof, a closed heater in said air heating chamber spaced from the top and walls thereof and forming therewith passages for the circulation of heated air past the walls of the heater to said open grill, means connecting said heater to a flue, and a cabinet closure for said air heating chamber permitting the inspection and operation of said flue connected heater located therein.

12. In a combination cooking and heating range, a range casing defining the front, rear, and end walls of the range, a vertical inner wall extending transversely from said front to said rear walls and positioned to provide with one of said end walls an end chamber, a heater casing positioned in said chamber and spaced from said end wall and said transverse wall whereby a vertical warm air circulating passage is provided at an end of the range and at an inner portion of the range.

13. A cooking stove comprising, a stove casing including front and rear and end walls, interior walls cooperated with certain of said first walls to provide a top burner chamber and a warming closet, one of the walls of said closet cooperating with said front and rear and one end wall of said casing to define a compartment, a heater casing in said compartment spaced from said walls to define a narrow vertically extending air passage surrounding at least a substantial portion of said heater casing, said compartment being open to the atmosphere at the lower and upper portions thereof for circulation of air, a burner for said heater casing, and means for venting the products from said burner separately from said passage.

14. In a combination cooking and heating range, a range casing including front and rear and end walls of the range, a transverse vertically extending inner wall positioned to provide with one of said end walls and said front and rear wall an end chamber, a heater casing positioned in said chamber and spaced from said end wall and said inner wall to define vertical warm air circulating passages at the end of the range and at an inner portion of the range, said chamber being open to the atmosphere at the lower and upper portions thereof for circulating air through said passage, a burner for said heater casing, said heater casing being provided with a lighter opening at the front thereof, and said front stove wall being provided with a movable portion to permit access to said lighter opening.

JOSEPH E. LEONARD.